(12) United States Patent
Belack et al.

(10) Patent No.: US 8,669,296 B2
(45) Date of Patent: Mar. 11, 2014

(54) METHOD FOR THE PRODUCTION OF A HIGH-MOLECULAR POLYAZOL

(75) Inventors: Jörg Belack, Mainz (DE); Klaus Leitner, Ludwigshafen (DE); Hansjoachim Scupin, Ludwigshafen (DE); Oemer Uensal, Mainz (DE)

(73) Assignee: BASF SE, Ludwigshafen (DE)

( * ) Notice: Subject to any disclaimer, the term of this patent is extended or adjusted under 35 U.S.C. 154(b) by 32 days.

(21) Appl. No.: 13/377,346

(22) PCT Filed: Jun. 17, 2010

(86) PCT No.: PCT/EP2010/003671
§ 371 (c)(1),
(2), (4) Date: Dec. 9, 2011

(87) PCT Pub. No.: WO2010/145828
PCT Pub. Date: Dec. 23, 2010

(65) Prior Publication Data
US 2012/0101173 A1    Apr. 26, 2012

(30) Foreign Application Priority Data

Jun. 20, 2009  (EP) .................................. 09008110
Dec. 15, 2009  (EP) .................................. 09015457

(51) Int. Cl.
*C08J 5/22*    (2006.01)

(52) U.S. Cl.
USPC ............... 521/27; 429/33; 429/303; 429/309; 204/263; 204/293

(58) Field of Classification Search
USPC ........ 521/27; 429/33, 303, 309; 204/263, 293
See application file for complete search history.

(56) References Cited

U.S. PATENT DOCUMENTS

| | | | | |
|---|---|---|---|---|
| 4,141,800 | A | * | 2/1979 | Breuer et al. ............... 205/779.5 |
| 7,288,603 | B2 | * | 10/2007 | Sakaguchi et al. ............ 525/411 |
| 2005/0147859 | A1 | | 7/2005 | Kiefer et al. |
| 2006/0008690 | A1 | * | 1/2006 | Uensal et al. ................... 429/33 |
| 2008/0050514 | A1 | * | 2/2008 | Calundann et al. ........... 427/115 |
| 2010/0181697 | A1 | | 7/2010 | Uensal et al. |
| 2010/0216051 | A1 | | 8/2010 | Uensal et al. |
| 2011/0288187 | A1 | | 11/2011 | Calundann et al. |

FOREIGN PATENT DOCUMENTS

| | | |
|---|---|---|
| DE | 102 13 540 A1 | 2/2004 |
| DE | 102 46 46 A1 | 4/2004 |
| DE | 102 46 459 A1 | 4/2004 |
| WO | WO-9613872 A1 | 5/1996 |
| WO | WO-9904445 A1 | 1/1999 |
| WO | WO-02088219 A1 | 11/2002 |
| WO | WO-03022412 A2 | 3/2003 |
| WO | WO-2005/011039 A2 * | 2/2005 |
| WO | WO-2008/031554 A1 * | 3/2008 |
| WO | WO-2008031554 A1 | 3/2008 |

OTHER PUBLICATIONS

International Search Report for PCT/EP2010/003671 mailed Jan. 5, 2010.
International Preliminary Report on Patentability for PCT/EP2010/003671 mailed Aug. 2, 2011.

* cited by examiner

*Primary Examiner* — Peter D. Mulcahy
*Assistant Examiner* — Henry Hu
(74) *Attorney, Agent, or Firm* — Novak Druce Connolly Bove + Quigg LLP

(57) ABSTRACT

A process for preparing a polyazole with an inherent viscosity, measured in at least 96% sulfuric acid at 25° C., greater than 2.9 dl/g, comprising the steps of
i) mixing one or more aromatic tetraamino compounds with one or more aromatic carboxylic acids or esters thereof which comprise at least two acid groups per carboxylic acid monomer, or mixing one or more aromatic and/or heteroaromatic diaminocarboxylic acids, in polyphosphoric acid to form a solution and/or dispersion
ii) heating the mixture from step i) under inert gas to temperatures in the range from 120° C. to 350° C. to form the polyazole,
wherein
in step ii), a mixture having a concentration of polyphosphoric acid, calculated as $P_2O_5$ (by acidimetric means), based on the total amount of $H_3PO_4$, polyphosphoric acid and water in the mixture, greater than 78.22%, is heated,
the amounts of the components are selected in step i) such that the proportion by weight of the tetraamino compounds and of the aromatic carboxylic acids or esters thereof which comprise at least two acid groups per carboxylic acid monomer, or of the diaminocarboxylic acids of the mixture in step ii), based on the total weight of the mixture, is less than 11.0% by weight,
the reaction mixture is heated in step ii) to greater than 220° C.

21 Claims, No Drawings

METHOD FOR THE PRODUCTION OF A HIGH-MOLECULAR POLYAZOL

CROSS-REFERENCE TO RELATED APPLICATIONS

This application is a national stage application (under 35 U.S.C. §371) of PCT/EP2010/003671, filed Jun. 17, 2010, which claims benefit of European application 09008110.0, filed Jun. 20, 2009, and European application 09015457.6, filed Dec. 15, 2009.

BACKGROUND OF THE INVENTION

The present invention relates to a process for preparing a high molecular weight polyazole, which can be used especially for production of polymer electrolyte membranes, preferably for production of membrane electrode assemblies for fuel cells.

Polymer electrolyte membranes (PEMs) are already known and are especially used in fuel cells. Frequently, sulfonic acid-modified polymers, especially perfluorinated polymers, are employed. A prominent example thereof is Nafion™ from DuPont de Nemours, Willmington USA. For proton conduction, a relatively high water content in the membrane is required, which is typically 4-20 molecules of water per sulfonic acid group. The necessary water content, but also the stability of the polymer in conjunction with acidic water and the hydrogen and oxygen reaction gases, limits the operating temperature of the PEM fuel cell stack typically to 80-100° C. Under pressure, the operating temperature can be increased to >120° C. Otherwise, higher operating temperatures cannot be achieved without a loss in performance of the fuel cell.

For system reasons, however, higher operating temperatures than 100° C. in the fuel cell are desirable. The activity of the noble metal-based catalysts present in the membrane electrode unit (MEU) is significantly better at high operating temperatures. More particularly, in the case of use of what are called reformates from hydrocarbons, distinct amounts of carbon monoxide are present in the reformer gas, which typically have to be removed by complex gas treatment or gas purification. At high operating temperatures, the tolerance of the catalysts to the CO impurities rises up to several % by volume of CO.

In addition, heat evolves in the operation of fuel cells. Cooling of these systems to below 80° C. can, however, be very costly and inconvenient. According to the power output, the cooling apparatuses can be made much simpler. This means that, in fuel cell systems which are operated at temperatures above 100° C., the waste heat can be utilized much better, and hence the fuel cell system efficiency can be enhanced by power-heat coupling.

In order to attain these temperatures, membranes with novel conductivity mechanisms are generally used. One approach for this purpose is the use of membranes which exhibit electrical conductivity without the use of water. A first development in this direction is detailed, for example, in WO 96/13872. For instance, WO 96/13872 discloses the use of acid-doped polybenzimidazole membranes which are produced by a casting process.

A new generation of acid-containing polyazole membranes which likewise exhibit electrical conductivity without the use of water is described in WO 02/088219. This application discloses a proton-conducting polymer membrane based on polyazoles, which is obtainable by a process comprising the following steps:

A) mixing one or more aromatic tetraamino compounds with one or more aromatic carboxylic acids or esters thereof which comprise at least two acid groups per carboxylic acid monomer, or mixing one or more aromatic and/or heteroaromatic diaminocarboxylic acids, in polyphosphoric acid to form a solution and/or dispersion B) applying a layer using the mixture according to step A) on a carrier, optionally on an electrode, C) heating the flat structure/sheet obtainable according to step B) under inert gas to temperatures of up to 350° C., preferably up to 280° C., to form the polyazole polymer, D) treating the membrane formed in step C) until it is self-supporting, preferably by partial hydrolysis.

The polyphosphoric acid used in step A) typically has a content, calculated as $P_2O_5$ (by acidimetric means), of at least 83%.

To adjust the viscosity, the solution can optionally be admixed with phosphoric acid (conc. phosphoric acid, 85%).

The examples describe numerous syntheses in a polyphosphoric acid having a content, calculated as $P_2O_5$ (by acidimetric means), of 83.4%.

The condensation of the monomers is generally initiated by a temperature ramp from 120° C. up to 220° C., the high molecular weight polymers being formed at the high temperatures at the end.

In example 3, a monomer mixture with a monomer solids content of 11.2% is heated stepwise actually to 240° C.

Some of the batches are subsequently diluted with conc. phosphoric acid and then optionally heated to 240° C. Under the conditions specified in this context, however, no further significant polycondensation takes place.

The content of the resulting solutions, calculated as $P_2O_5$ (by acidimetric means), is either at most 70.487752% (=theoretical $H_3PO_4$ concentration: 97.3%; example 5) or at least 75.465388% (=theoretical $H_3PO_4$ concentration: 104.2%, example 3).

The intrinsic viscosity of the polymers at 30° C. is 2.9 dl/g or less.

For the application, however, higher molecular weights (inherent viscosities) would be desirable. These could in principle be attained by heating the reaction mixture to higher temperatures than 220° C. and/or using a polyphosphoric acid with a higher $P_2O_5$ content. However, controlling the polycondensation reaction in the batches described in this publication under such conditions presents considerable problems since the polycondensation rate increases markedly with rising temperature or higher $P_2O_5$ concentration. The result is that the polycondensation proceeds extremely rapidly and can no longer stopped in a defined manner, for example at a given molecular weight. On the contrary, the significant rise in viscosity of the reaction mixture can lead in the worst case to the solidification of the reaction mixture within the reactor. The resulting compositions then no longer flow and cannot be discharged from the reactor either. In the case of large batch sizes, reactors then have to be dismantled and cleaned in a costly and inconvenient manner. Furthermore, the reactor is temporarily unusable for further reactions, and the mechanical removal of solidified reaction product can lead to damage to coated vessel walls. Simple cleaning by adding a solvent is likewise impossible since the tank is always almost completely filled in the course of the reaction.

BRIEF SUMMARY OF THE INVENTION

It was therefore an object of the present invention to indicate more efficient means for preparation of polyazoles with high molecular weight. What was desired was especially a process which can be used for production of polyazole membranes and enables simple and efficient further processing of such polyazole membranes, especially in the production of membrane electrode assemblies, preferably for fuel cells. More particularly, better control of the polycondensation reaction was to be ensured, and the option of defined stoppage of the reaction, for example at a given molecular weight, was desired. Furthermore, the space-time yield of the conventional processes was to be improved and damage to the reactor was to be avoided to the best degree possible. In addition, the option of simple cleaning of the reactor if required was desired. Finally, simple further processing of the polymers and the production of thin, defect-free membranes and self-supporting films was also to be possible. At the same time, a particular aim was the admixability of additives, for example crosslinkers, fillers or the like, without any significant influence on the flow properties of the polymers or membranes. Moreover, the polymers and membranes were if at all possible to have improved properties, such as superior mechanical properties, more particularly a higher tensile strength and/or an improved mechanical stability. At the same time, the desired advantages and effects were to be achievable in a very simple manner, on the industrial scale and inexpensively.

These objects are achieved by the provision of a process having all the features of claim 1. Particularly appropriate procedures are described in the dependent claims.

The present invention accordingly provides a process for preparing a polyazole with an inherent viscosity, measured in at least 96% sulfuric acid at 25° C., greater than 2.9 dl/g, comprising the steps of i) mixing one or more aromatic tetraamino compounds with one or more aromatic carboxylic acids or esters thereof which comprise at least two acid groups per carboxylic acid monomer, or mixing one or more aromatic and/or heteroaromatic diaminocarboxylic acids, in polyphosphoric acid to form a solution and/or dispersion ii) heating the mixture from step i) under inert gas to temperatures in the range from 120° C. to 350° C. to form the polyazole, which comprises in step ii), heating a mixture having a concentration of polyphosphoric acid, calculated as $P_2O_5$ (by acidimetric means), based on the total amount of $H_3PO_4$, polyphosphoric acid and water in the mixture, greater than 78.22%, preferably greater than 78.95%, more preferably greater than 79.67%, appropriately greater than 80.40%, even more preferably greater than 81.12%, very especially preferably greater than 81.85%, suitably greater than 82.57%, especially greater than 83.29%, selecting the amounts of the components in step i) such that the proportion by weight of the tetraamino compounds and of the aromatic carboxylic acids or esters thereof which comprise at least two acid groups per carboxylic acid monomer, or of the diaminocarboxylic acids of the mixture in step ii), based on the total weight of the mixture, is less than 11.0% by weight, preferably less than 10.0% by weight, more preferably less than 9.0% by weight, appropriately less than 8.0% by weight, even more preferably less than 7.0% by weight, very especially preferably less than 6.0% by weight, suitably less than 5.0% by weight, especially less than 4.0% by weight, heating the reaction mixture in step ii) to greater than 220° C., preferably greater than 230° C., more preferably greater than 240° C., especially greater than 250° C.

DETAILED DESCRIPTION OF THE INVENTION

In addition, preference is given to heating, in step ii), a mixture having a concentration of polyphosphoric acid, calculated as $P_2O_5$ (by acidimetric means), based on the total amount of $H_3PO_4$, polyphosphoric acid and water in the mixture, of less than 85.47%, preferably less than 84.74%, especially less than 84.02%, preference is given to selecting the amounts of the components in step i) such that the proportion by weight of the tetraamino compounds and of the aromatic carboxylic acids or esters thereof which comprise at least two acid groups per carboxylic acid monomer, or of the diaminocarboxylic acids of the mixture in step ii), based on the total weight of the mixture, is greater than 0.1% by weight, preferably greater than 0.5% by weight, more preferably greater than 1.0% by weight, appropriately greater than 1.5% by weight, especially greater than 2.0% by weight, the reaction temperature selected in step ii) is preferably less than 300° C., more preferably less than 290° C., especially preferably less than 280° C., especially less than 270° C.

The process according to the invention serves for preparation of a polyazole. Polyazoles in the context of the present invention are understood to mean those polymers in which the repeat unit in the polymer preferably comprises at least one aromatic ring with at least one nitrogen atom. The aromatic ring is preferably a five- or six-membered ring which has one to three nitrogen atoms and may be fused to one other ring, more particularly another aromatic ring. Individual nitrogen heteroatoms may also be replaced by oxygen, phosphorus and/or sulfur atoms. The heterocyclic aromatic rings are preferably in the main polymer chain, but may also be in the side chain. Particular preference is given to those basic polymers which comprise, in the repeat unit, unsaturated five-membered or six-membered aromatic units containing, in the ring, 1-5 nitrogen atoms or, as well as nitrogen atoms, one or more other heteroatoms.

The resulting polyazole, preferably a polybenzimidazole, has a high molecular weight. Measured as the intrinsic viscosity, this is greater than 2.9 dl/g and is preferably at least 3.0 dl/g, preferably at least 3.5 dl/g, more preferably at least 4.0 dl/g, especially at least 4.5 dl/g. The upper limit is preferably 8.0 dl/g, more preferably 7.0 dl/g, especially preferably 6.0 dl/g, especially 5.5 dl/g. The molecular weight is thus well above that of the commercial polybenzimidazole (IV<1.1 dl/g).

The intrinsic viscosity is determined as described hereinafter: For this purpose, the polymer is first dried at 160° C. over 2 h. 100 mg of the polymer thus dried are then dissolved in 100 ml of concentrated sulfuric acid (min. 96% by weight) at 80° C. over 4 h. The inherent or intrinsic viscosity is determined from this solution to ISO 3105 (DIN 51562, ASTM D2515) with an Ubbelohde viscometer at a temperature of 25° C.

Further information regarding inherent viscosity and the corresponding determination methods can be found in the standard specialist literature, for example Ullmann 1, 67-85; (4.) 5, 755-778, the disclosure of which is hereby incorporated by reference.

The resulting polyazole preferably comprises repeat azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVII) and/or (XVIII) and/or (XIX) and/or (XX) and/or (XXI) and/or (XXII)
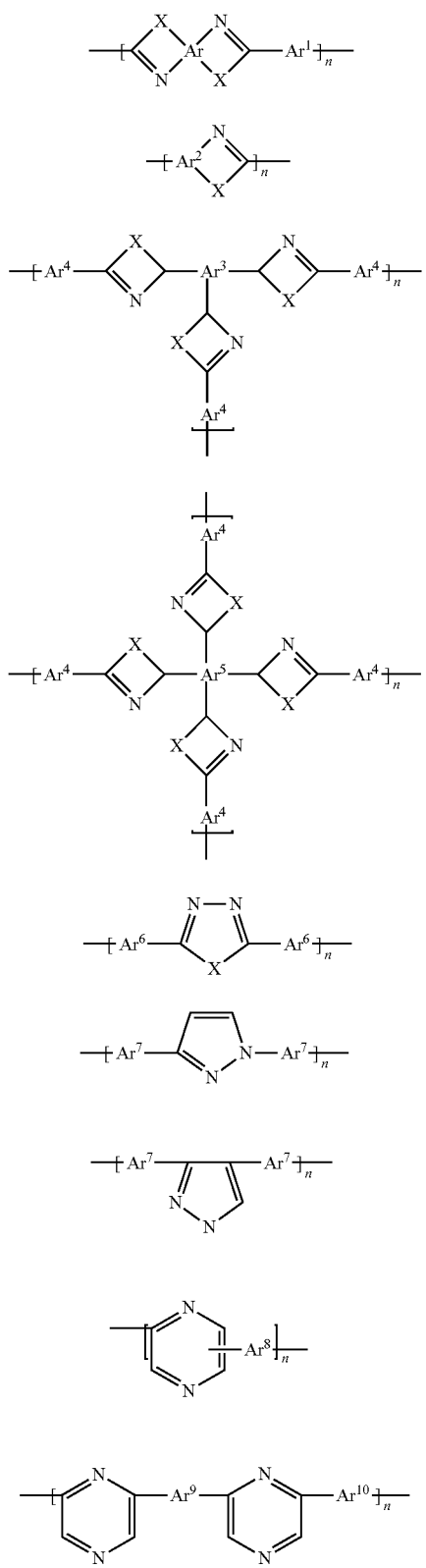
(I)
(II)
(III)
(IV)
(V)
(VI)
(VII)
(VIII)
(IX)
-continued
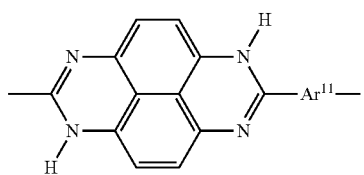
(X)
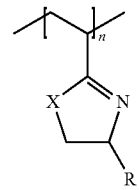
(XI)
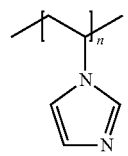
(XII)
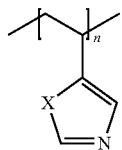
(XIII)
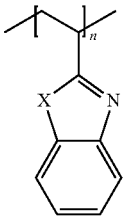
(XIV)
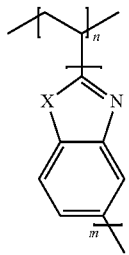
(XV)
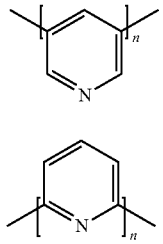
(XVI)
(XVII)
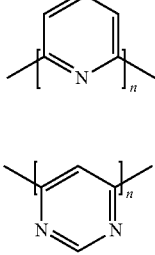
(XVIII)

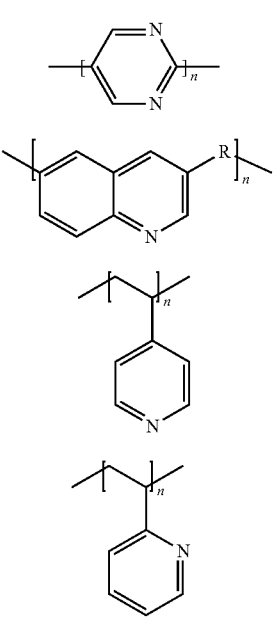

in which
Ar are the same or different and are each a tetravalent aromatic or heteroaromatic group which may be mono- or polycyclic,
$Ar^1$ are the same or different and are each a divalent aromatic or heteroaromatic group which may be mono- or polycyclic,
$Ar^2$ are the same or different and are each a di- or trivalent aromatic or heteroaromatic group which may be mono- or polycyclic,
$Ar^3$ are the same or different and are each a trivalent aromatic or heteroaromatic group which may be mono- or polycyclic,
$Ar^4$ are the same or different and are each a trivalent aromatic or heteroaromatic group which may be mono- or polycyclic,
$Ar^5$ are the same or different and are each a tetravalent aromatic or heteroaromatic group which may be mono- or polycyclic,
$Ar^6$ are the same or different and are each a divalent aromatic or heteroaromatic group which may be mono- or polycyclic,
$Ar^7$ are the same or different and are each a divalent aromatic or heteroaromatic group which may be mono- or polycyclic,
$Ar^8$ are the same or different and are each a trivalent aromatic or heteroaromatic group which may be mono- or polycyclic,
$Ar^9$ are the same or different and are each a di- or tri- or tetravalent aromatic or heteroaromatic group which may be mono- or polycyclic,
$Ar^{10}$ are the same or different and are each a di- or trivalent aromatic or heteroaromatic group which may be mono- or polycyclic,
$Ar^{11}$ are the same or different and are each a divalent aromatic or heteroaromatic group which may be mono- or polycyclic,
X is the same or different and is oxygen, sulfur or an amino group which bears a hydrogen atom, a group having 1-20 carbon atoms, preferably a branched or unbranched alkyl or alkoxy group, or an aryl group as a further radical, R in all formulae except formula (XX) is the same or different and is hydrogen, an alkyl group or an aromatic group, and in formula (XX) is an alkylene group or an aromatic group, and n, m are each integers greater than or equal to 10, preferably greater than or equal to 100.

Preferred aromatic or heteroaromatic groups derive from benzene, naphthalene, biphenyl, diphenyl ether, diphenylmethane, diphenyldimethylmethane, bisphenone, diphenylsulfone, quinoline, pyridine, bipyridine, pyridazine, pyrimidine, pyrazine, triazine, tetrazine, pyrrole, pyrazole, anthracene, benzopyrrole, benzotriazole, benzoxathiadiazole, benzoxadiazole, benzopyridine, benzopyrazine, benzopyrazidine, benzopyrimidine, benzopyrazine, benzotriazine, indolizine, quinolizine, pyridopyridine, imidazopyrimidine, pyrazinopyrimidine, carbazole, aciridine, phenazine, benzoquinoline, phenoxazine, phenothiazine, acridizine, benzopteridine, phenanthroline and phenanthrene, which may optionally also be substituted.

The substitution pattern of $Ar^1$, $Ar^4$, $Ar^6$, $Ar^7$, $Ar^8$, $Ar^9$, $Ar^{10}$, $Ar^{11}$ is as desired; in the case of phenylene, for example, $Ar^1$, $Ar^4$, $Ar^6$, $Ar^7$, $Ar^8$, $Ar^9$, $Ar^{10}$, $Ar^{11}$ may be ortho-, meta- and para-phenylene. Particularly preferred groups derive from benzene and biphenylene, which may optionally also be substituted.

Preferred alkyl groups are short-chain alkyl groups having 1 to 4 carbon atoms, for example methyl, ethyl, n- or i-propyl and t-butyl groups.

Preferred aromatic groups are phenyl or naphthyl groups. The alkyl groups and the aromatic groups may be substituted.

Preferred substituents are halogen atoms, for example fluorine, amino groups, hydroxy groups or short-chain alkyl groups, for example methyl or ethyl groups.

Preference is given to polyazoles having repeat units of the formula (I) in which the X radicals are the same within one repeat unit.

The polyazoles may in principle also have different repeat units which differ, for example, in their X radical. However, it preferably has only identical X radicals in one repeat unit.

Further preferred polyazole polymers are polyimidazoles, polybenzothiazoles, polybenzoxazoles, polyoxadiazoles, polyquinoxalines, polythiadiazoles, poly(pyridines), poly(pyrimidines) and poly(tetraazapyrenes).

In a further embodiment of the present invention, the polyazole is a copolymer which comprises at least two units of the formulae (I) to (XXII) which differ from one another. The polymers may be in the form of block copolymers (diblock, triblock), random copolymers, periodic copolymers and/or alternating polymers.

In a particularly preferred embodiment of the present invention, the polyazole is a homopolymer which comprises only units of the formula (I) and/or (II).

The number of repeat azole units in the polymer is preferably an integer greater than or equal to 10. Particularly preferred polymers comprise at least 100 repeat azole units.

In the context of the present invention, preference is given to polymers comprising repeat benzimidazole units. Some examples of the highly appropriate polymers comprising repeat benzimidazole units are represented by the following formulae:

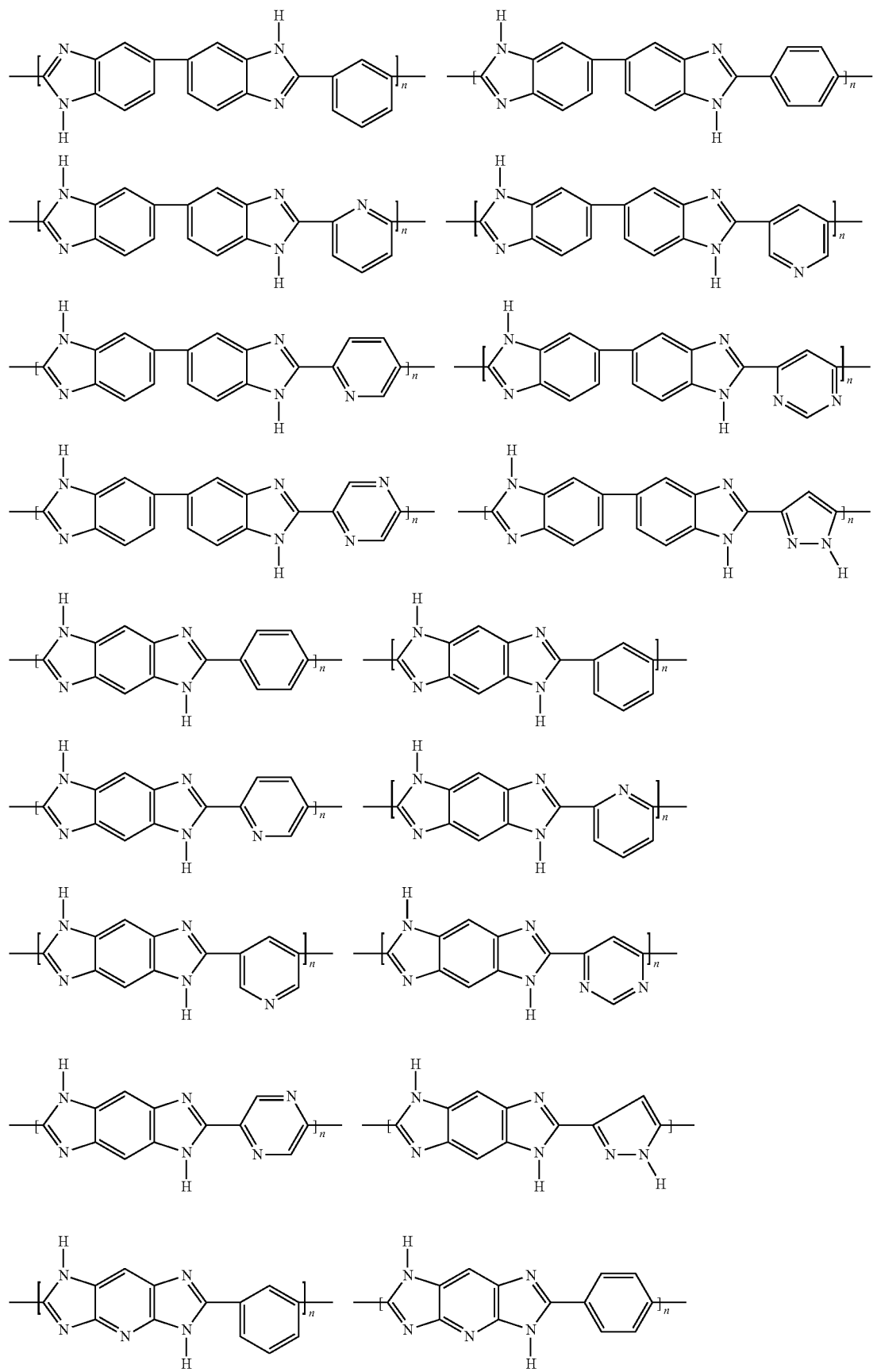

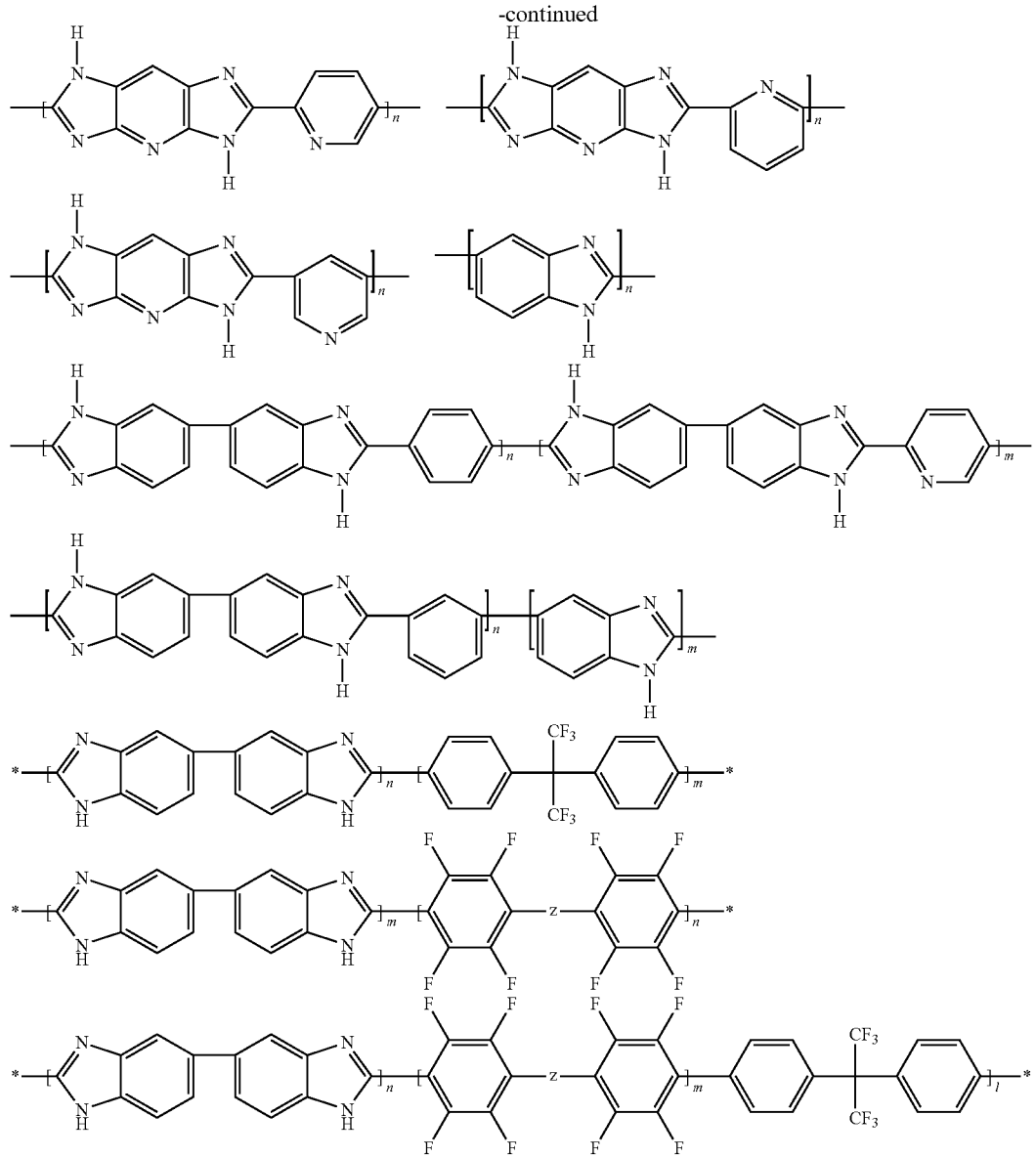

In the last formula, the azole units and the two fluorinated components may be joined to one another in any sequence. The preparation can be effected in the form of a polymer, random copolymer or block copolymer.

In addition, n and m in the above formulae are each independently an integer greater than or equal to 10, preferably greater than or equal to 100.

In a particularly preferred variant of the present invention, the polyazoles have at least one sulfonic acid and/or phosphonic acid group. Such polymers are described in publication DE 102 46 459 A1, the disclosure of which is hereby incorporated by reference.

Preferred polybenzimidazoles are commercially available under the ®Celazole or else ®Hozole (from Hostec, Austria) trade name.

The polyazoles are prepared by reacting one or more aromatic and/or heteroaromatic tetraamino compounds with one or more aromatic and/or heteroaromatic carboxylic acids or derivatives thereof which comprise at least two acid groups per carboxylic acid monomer. Alternatively, it is also possible to use one or more aromatic and/or heteroaromatic diaminocarboxylic acids for preparation of polyazoles.

The usable aromatic and heteroaromatic tetraamino compounds include 3,3',4,4'-tetraaminobiphenyl, 2,3,5,6-tetraaminopyridine, 1,2,4,5-tetraaminobenzene, 3,3',4,4'-tetraaminodiphenyl sulfone, 3,3',4,4'-tetraaminodiphenyl ether, 3,3',4,4'-tetraaminobenzophenone, 3,3',4,4'-tetraaminodiphenylmethane and 3,3',4,4'-tetraaminodiphenyldimethylmethane and salts thereof, especially the mono-, di-, tri- and tetrahydrochloride derivatives thereof. Among these, particular preference is given to 3,3',4,4'-tetraaminobiphenyl, 2,3,5, 6-tetraaminopyridine and 1,2,4,5-tetraaminobenzene.

The aromatic and/or heteroaromatic carboxylic acids are preferably dicarboxylic acids and tricarboxylic acids and tetracarboxylic acids, or the esters thereof or the anhydrides thereof or the acid halides thereof, especially the acid halides and/or acid bromides thereof. The aromatic dicarboxylic acids are preferably isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether-4,4'-dicarboxylic acid, benzophenone-4,4'-dicarboxylic acid, diphenyl sulfone-4,4'-dicarboxylic acid, biphenyl-4,4'-dicarboxylic acid, 4-trifluoromethylphthalic acid, 2,2-bis(4-carboxyphenyl)hexafluoropropane, 4,4'-stilbenedicarboxylic acid and 4-carboxycinnamic acid, or the C1-C20-alkyl esters or C5-C12-aryl esters thereof or the acid anhydrides thereof or the acid chlorides thereof.

The aromatic tricarboxylic acids or the C1-C20-alkyl esters or C5-C12-aryl esters thereof or the acid anhydrides thereof or the acid chlorides thereof are preferably 1,3,5-benzenetricarboxylic acid (trimesic acid); 1,2,4-benzenetricarboxylic acid (trimellitic acid); (2-carboxyphenyl)iminodiacetic acid, 3,5,3'-biphenyltricarboxylic acid; 3,5,4'-biphenyltricarboxylic acid.

The aromatic tetracarboxylic acids or the C1-C20-alkyl esters or C5-C12-aryl esters thereof or the acid anhydrides thereof or the acid chlorides thereof are preferably 3,5,3',5'-biphenyltetracarboxylic acid, benzene-1,2,4,5-tetracarboxylic acid, benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid, 1,4,5,8-naphthalenetetracarboxylic acid.

The heteroaromatic carboxylic acids are preferably heteroaromatic dicarboxylic acids and tricarboxylic acids and tetracarboxylic acids, or the esters thereof or the anhydrides thereof. Heteroaromatic carboxylic acids are understood to mean aromatic systems which contain at least one nitrogen, oxygen, sulfur or phosphorus atom in the aromatic ring. They are preferably pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, and also the C1-C20-alkyl esters or C5-C12-aryl esters thereof, or the acid anhydrides thereof or the acid chlorides thereof.

The content of tricarboxylic acid or tetracarboxylic acids (based on the dicarboxylic acid used) is preferably between 0 and 30 mol %, preferably 0.1 and 20 mol %, especially 0.5 and 10 mol %.

In addition, it is also possible to use aromatic and heteroaromatic diaminocarboxylic acids. These include diaminobenzoic acid, 4-phenoxycarbonyl-3',4'-diaminodiphenyl ether and the mono- and dihydrochloride derivatives thereof.

Preferably, mixtures of at least 2 different aromatic carboxylic acids are used. Particular preference is given to using mixtures which comprise, as well as aromatic carboxylic acids, also heteroaromatic carboxylic acids. The mixing ratio of aromatic carboxylic acids to heteroaromatic carboxylic acids is between 1:99 and 99:1, preferably between 1:50 and 50:1.

These mixtures are especially mixtures of N-heteroaromatic dicarboxylic acids and aromatic dicarboxylic acids. Nonlimiting examples of dicarboxylic acids are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether-4,4'-dicarboxylic acid, benzophenone-4,4'-dicarboxylic acid, diphenyl sulfone-4,4'-dicarboxylic acid, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid.

The molar ratio of carboxylic acid groups to amino groups in the reaction of tetraamino compounds with one or more aromatic carboxylic acids or esters thereof which comprise at least two acid groups per carboxylic acid monomer is preferably close to 1:2.

Preferably at least 0.5% by weight, especially 1 to 30% by weight and more preferably 2 to 15% by weight of monomers are used for the preparation of polyazoles, based in each case on the resulting weight of the composition to be used.

When tricarboxylic acids or tetracarboxylic acids are also used, this achieves branching/crosslinking of the polymer formed. This contributes to improvement in the mechanical properties.

For polymerization, the monomer(s) is/are heated to the aforementioned temperatures for a suitable time interval, preferably for longer than one minute, more preferably longer than 30 minutes, preferably longer than one hour, even more preferably longer than 2 hours, more preferably still longer than 4 hours, most preferably longer than 6 hours, especially longer than 8 hours. The temperature increase may be continuous or else discontinuous. A particularly useful procedure has been found to be one in which the temperature is increased stepwise up to the end temperature.

In a further aspect of the present invention, compounds suitable for formation of polyazoles under the action of heat are used, these compounds being obtainable by reaction of one or more aromatic and/or heteroaromatic tetraamino compounds with one or more aromatic and/or heteroaromatic carboxylic acids or derivatives thereof which comprise at least two acid groups per carboxylic acid monomer, or of one or more aromatic and/or heteroaromatic diaminocarboxylic acids in the melt at temperatures of up to 400° C., especially up to 350° C., preferably up to 280° C. The compounds to be used for preparation of these prepolymers have been detailed above.

The polyphosphoric acid $H_{n+2}P_nO_{3n+1}$ (n>1) used may be commercial polyphosphoric acid, as obtainable, for example, from Riedel-de Haen.

The mixture obtained in step i) preferably has a weight ratio of polyphosphoric acid to the sum of all monomers of 1:10 000 to 10 000:1, preferably 1:1000 to 1000:1, especially 1:100 to 100:1.

In a particularly preferred embodiment of the present invention, in step ii), the concentration of polyphosphoric acid in the mixture, calculated as $P_2O_5$ (by acidimetric means), is reduced, based on the total amount of $H_3PO_4$, polyphosphoric acid and water in the mixture. This is preferably done by adding orthophosphoric acid ($H_3PO_4$) or water.

The concentration of polyphosphoric acid in the mixture, calculated as $P_2O_5$ (by acidimetric means), based on the total amount of $H_3PO_4$, polyphosphoric acid and water in the mixture, after reducing the concentration is preferably at least 78.22%, more preferably at least 78.95%, especially at least 79.67%. In addition, it is preferably less than 85.47%, preferably less than 84.74%, especially less than 84.02%.

Particular preference is given to the addition of a composition in the form of a solution and/or dispersion which comprises at least one polyazole with an intrinsic viscosity, measured in at least 96% by weight sulfuric acid, in the range from 3.0 to 8.0 g/dl, and orthophosphoric acid and/or polyphosphoric acid, where the polyazole content, based on the total weight of the composition, is in the range from 0.5% by weight to 30.0% by weight, preferably in the range from 1.0% by weight to 20.0% by weight, more preferably in the range from 1.5% by weight to 10.0% by weight, especially in the range from 1.7% by weight to 5.0% by weight, the $H_3PO_4$ and/or polyphosphoric acid content, based on the total weight of the composition, is in the range from 30.0% by weight to 99.5% by weight, preferably in the range from 40.0% by weight to 99.0% by weight, more preferably in the range from 60.0% by weight to 98.5% by weight, especially in the range from 85.0% by weight to 95.0% by weight, the $H_3PO_4$ and/or polyphosphoric acid concentration, calculated as $P_2O_5$ (by acidimetric means), based on the total amount of $H_3PO_4$ and/or polyphosphoric acid and/or water, is in the range from 70.5% to 75.45%, preferably in the range from 71.0% to 75.0%, more preferably in the range from 71.5% to 74.0%, even more preferably in the range from 71.7% to 73.0%, especially in the range from 72.0% to 72.4%.

The amount of the composition to be added is preferably in the range from 0.1% by weight to 50.0% by weight, more preferably in the range from 0.5% by weight to 40.0% by weight, especially in the range from 1.0% by weight to 30.0% by weight, based in each case on the total weight of the mixture from step i).

The composition usable in this context is present in the form of a dispersion and/or solution and may optionally comprise small solids contents and/or gel contents. More preferably, the proportion of constituents which can be filtered off is, however, less than 30.0% by weight, preferably less than 10.0% by weight, more preferably less than 5.0% by weight, especially preferably less than 3.0% by weight, especially less than 1.0% by weight, based in each case on the total weight of the composition. The amounts which can be filtered off are favorably determined at 160° C. In addition, preference is given to using sieves with sieve orifices (meshes) smaller than 1.0 mm, preferably smaller than 500 μm, more preferably smaller than 100 μm.

To further improve the performance properties, it is additionally possible to add fillers, especially proton-conducting fillers, and additional acids to the composition.

Nonlimiting examples of proton-conducting fillers are sulfates such as: $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$, phosphates such as $Zr_3(PO_4)_4$, $Zr(HPO_4)_2$, $HZr_2(PO_4)_3$, $UO_2PO_4 \cdot 3H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2O_8$, $HSb_3P_2O_{14}$, $H_5Sb_5P_2O_{20}$, polyacids such as $H_3PW_{12}O_{40} \cdot nH_2O$ (n=21-29), $H_3SiW_{12}O_{40} \cdot nH_2O$ (n=21-29), $H_xWO_3$, $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_6$, $HSbO_3$, $H_2MoO_4$ selenites and arsenides such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$, phosphides such as ZrP, TiP, HfP oxides such as $Al_2O_3$, $Sb_2O_5$, $ThO_2$, $SnO_2$, $ZrO_2$, $MoO_3$ silicates such as zeolites, zeolites (NH$_4$+), sheet silicates, framework silicates, H-natrolites, H-mordenites, NH$_4$-analcines, NH$_4$-sodalites, NH$_4$-gallates, H-montmorillonites, other condensation products of orthosilicic acid $Si(OH)_4$ and the salts and esters thereof, polysiloxanes of the general formula $H_3Si$—(O—$SiH_2$—)$_n$—O—$SiH_3$, and especially also other clay minerals, such as montmorillonites, bentonites, kaolinites, pyrophillites, talc, chlorites, muscovites, mica, smectites, halosites, vermiculites and hydrotalcites.

acids such as $HClO_4$, $SbF_5$ fillers such as carbides, especially SiC, $Si_3N_4$, fibers, especially glass fibers, glass powders and/or polymer fibers, nonwovens or wovens, preferably based on polyazoles and/or polyaryl ether ketones or polyaryl ether sulfones, also partly crosslinked. The fillers may also be modified partly or fully, based on the aromatic content, by charged groups, particularly suitable groups in this context being sulfonic acid groups, phosphonic acid groups, phosphate groups and/or other anionic or cationic charged groups.

These additives may be present in the composition in customary amounts, although the positive properties, such as high conductivity, high lifetime and high mechanical stability of the membrane, should not be impaired too significantly by addition of excessively large amounts of additives. In general, the resulting membrane comprises at most 80% by weight, preferably at most 50% by weight and more preferably at most 20% by weight of additives.

The composition may also further comprise perfluorinated sulfonic acid additives (preferably 0.1-20% by weight, more preferably 0.2-15% by weight, very preferably 0.2-10% by weight). These additives lead to improved performance, in the vicinity of the cathode to an increase in the oxygen solubility and oxygen diffusion, and to a reduction in the adsorption of phosphoric acid and phosphate to platinum. (Electrolyte additives for phosphoric acid fuel cells. Gang, Xiao; Hjuler, H. A.; Olsen, C.; Berg, R. W.; Bjerrum, N. J., Chem. Dep. A, Tech. Univ. Denmark, Lyngby, Den., J. Electrochem. Soc. (1993), 140(4), 896-902 and Perfluorosulfonimide as an additive in phosphoric acid fuel cell. Razaq, M.; Razaq, A.; Yeager, E.; DesMarteau, Darryl D.; Singh, S., Case Cent. Electrochem. Sci., Case West. Reserve Univ., Cleveland, Ohio, USA. J. Electrochem. Soc. (1989), 136(2), 385-90.)

Nonlimiting examples of persulfonated additives are: trifluoromethanesulfonic acid, potassium trifluoromethanesulfonate, sodium trifluoromethanesulfonate, lithium trifluoromethanesulfonate, ammonium trifluoromethanesulfonate, potassium perfluorohexanesulfonate, sodium perfluorohexanesulfonate, lithium perfluorohexanesulfonate, ammonium perfluorohexanesulfonate, perfluorohexanesulfonic acid, potassium nonafluorobutanesulfonate, sodium nonafluorobutanesulfonate, lithium nonafluorobutanesulfonate, ammonium nonafluorobutanesulfonate, cesium nonafluorobutanesulfonate, triethylammonium perfluorohexanesulfonate, perfluorosulfoimides and Nafion.

The composition can be prepared by simply mixing the components. Alternatively, the concentration of $H_3PO_4$ and/or polyphosphoric acid-containing compositions with lower $P_2O_5$ concentration or the dilution of those compositions with higher $P_2O_5$ concentration, i.e. the removal or the supply of water, is also conceivable.

However, it should be noted in this context that, in some cases, especially at low temperatures and/or high solids contents, the dissolution or dispersion of the polyazole in the orthophosphoric acid and/or polyphosphoric acid is kinetically inhibited. The composition is then initially present in inhomogeneous form. At higher temperatures greater than 100° C., there is additionally evaporation of water out of the composition, with the result that the concentration of $H_3PO_4$ and/or polyphosphoric acid changes with time.

Appropriately, therefore, the composition is prepared by a process in which a) at least one polyazole is dissolved and/or dispersed in orthophosphoric acid and/or polyphosphoric acid, the concentration of $H_3PO_4$ and/or polyphosphoric acid, calculated as $P_2O_5$ based on the total amount of $H_3PO_4$ and/or polyphosphoric acid and/or water, selected being less than 72.0%, preferably less than 71.7%, more preferably less than %, even more preferably less than 71.0%, especially less than 70.5%, and b) water is removed from the solution or dispersion from step a) and the concentration of $H_3PO_4$ and/or polyphosphoric acid, calculated as $P_2O_5$ based on the total amount of $H_3PO_4$ and/or polyphosphoric acid and/or water, is increased preferably by at least 0.1%, more preferably by at least 0.5%, especially preferably by at least 1.0%, especially by at least 1.5%.

The solution or dispersion from step a) is generally obtainable in a manner known per se, for example by mixing the components. Further preparation methods are described in WO 02/08829.

More preferably, the solution or dispersion from step a) is obtained by hydrolyzing a solution or dispersion which comprises at least one polyazole and polyphosphoric acid. Such a solution or dispersion can be prepared by polymerizing the aforementioned monomers in polyphosphoric acid.

The solution or dispersion from step a) comprises, based on the total weight thereof, preferably at least 1.8% by weight, more preferably at least 2.0% by weight, especially in the range from 2.2 to 2.5% by weight, of at least one polyazole with an intrinsic viscosity, measured in at least 96% by weight sulfuric acid, in the range from 3.0 to 8 g/dl. The total amount of orthophosphoric acid, water and optionally phosphoric acid is preferably up to 98.2% by weight and is more preferably in the range from 90.0 up to 98.0% by weight, especially in the range from 95.0 to 97.8% by weight.

The water is removed in step b) preferably by evaporation, especially by heating the composition from step a) to more than 100° C. and/or by applying reduced pressure. Particular preference is given to a procedure in which the composition from step a) is heated to a temperature in the range from greater than 120° C. to 240° C., especially in the range from 120° C. to 160° C., appropriately for a time in the range from at least 1 h to at most 48 h, especially in the range from at least 2 h to at most 24 h.

In a further preferred variant of the present invention, the composition is prepared by I) initially charging a solution or dispersion of a polyazole with an intrinsic viscosity, measured in at least 96% by weight sulfuric acid, in the range from 3.0 to 8.0 g/dl in polyphosphoric acid at a temperature greater than 160° C., preferably greater than 180° C., especially in the range from 180° C. to 240° C., the concentration of $H_3PO_4$ and/or polyphosphoric acid, calculated as $P_2O_5$ (by acidimetric means) based on the total amount of $H_3PO_4$ and/or polyphosphoric acid and/or water, being greater than 72.4%, preferably greater than 73.0%, more preferably greater than 74.0%, even more preferably greater than 75.0%, especially greater than 75.45%, II) adding water, orthophosphoric acid and/or polyphosphoric acid to the solution or dispersion until the mixture has a total amount of $H_3PO_4$ and/or polyphosphoric acid, calculated as $P_2O_5$ (by acidimetric means) based on the total amount of $H_3PO_4$ and/or polyphosphoric acid and/or water, in the range from 70.5% to 75.45%, preferably in the range from 71.0% to 75.0%, more preferably in the range from 71.5% to 74.0%, even more preferably in the range from 71.7% to 73.0%, especially in the range from 72.0% to 72.4%, III) homogenizing the mixture while keeping the total amount of $H_3PO_4$ and/or polyphosphoric acid within the range specified in step II).

The solution or dispersion from step I) is generally obtainable in a manner known per se, for example by mixing the components. Further preparation methods are described in WO 02/08829.

The solution or dispersion from step I) is more preferably obtained by polymerizing the aforementioned monomers in polyphosphoric acid.

The solution or dispersion from step I) comprises, based on the total weight thereof, preferably at least 1.8% by weight, more preferably at least 2.0% by weight, especially in the range from 2.2 to 2.5% by weight, of at least one polyazole with an intrinsic viscosity, measured in at least 96% by weight sulfuric acid, in the range from 3.0 to 8 g/dl, and preferably up to 98.2% by weight, more preferably in the range from 90.0 up to 98.0% by weight, especially in the range from 95.0 to 97.8% by weight, of polyphosphoric acid and optionally orthophosphoric acid and/or water.

The polyphosphoric acid used may be commercial polyphosphoric acid as obtainable, for example, from Riedel-de Haen. The polyphosphoric acid $H_{n+2}P_nO_{3n+1}$ (n>1) preferably has a content, calculated as $P_2O_5$ (by acidimetric means), of at least 83%.

The conventional hydrolysis of such compositions leads to compositions with worsened flow behavior, which are no longer processible under standard conditions. Therefore, preference is given to performing steps II) and III).

The addition in step II) can be effected either in portions or continuously.

After the addition, the mixture comprises, based on the total weight thereof, preferably at least 1.6% by weight, more preferably at least 1.8% by weight, especially in the range from 2.0 to 2.3% by weight, of at least one polyazole with an intrinsic viscosity, measured in at least 96% by weight sulfuric acid, in the range from 3.0 to 8 g/dl, and preferably up to 98.4% by weight, preferably in the range from 90.0 up to 98.2% by weight, especially in the range from 95.0 to 98.0% by weight, of polyphosphoric acid and optionally orthophosphoric acid and/or water.

As a result of the addition in step II), an inhomogeneous mixture forms at first. "Inhomogeneous" refers here to a change in the optical or physical properties which alters the equality of a property over the entire extent of the system, or the homogeneity of the appearances of the solution. Typically, the change in the homogeneity of the solution is manifested by interface formation (separation of liquid from the viscous mass), change in the color (typically from green to yellowish), or else the separation of clearly visible particles or solid particles from the smooth solution. The solution is considered to be homogeneous when it appears to be the same as the solution or dispersion of the polyazole in polyphosphoric acid; any differences are merely in viscosity.

The homogenization in step III) is effected preferably in a closed system, for example in an autoclave. It is also particularly favorable to condense any water which evaporates and to supply it back to the mixture, preferably by condensing the evaporating water in at least one reflux condenser which is preferably connected directly to the reaction vessel.

Surprisingly, the solution homogenizes after a certain time, preferably within less than 4 h, especially after no later than 2 h. The solution viscosity of the mixture falls, and an inventive usable composition forms.

In a further particularly preferred embodiment of the present invention, orthophosphoric acid is added in step ii).

For the purposes of the present invention, it is also particularly appropriate to select the type and amount of the monomers for the polycondensation such that there is an upper limit to the resulting degree of polymerization.

The theoretical degree of polymerization of the polycondensate $(X_R)_n$, calculated at 100% conversion, is preferably not more than 10 000, more preferably not more than 5000, especially not more than 2000.

This is preferably determined as follows:

$$(X_R)_n = \frac{1+r_0}{1+r_0-2r_0 p_A}$$

where $$r_0 = \frac{n_A^0}{n_B^0}$$

$$p_A = \frac{n_A^0 - n_A}{n_A^0}$$

$n_A^0$: initial amount of the first monomer
$n_A$: amount of the first monomer still present after a time t
$n_B^0$: initial amount of the second monomer For stoichiometric polycondensations, $r_0=1$.

In the case of nonstoichiometric polycondensations, A denotes the monomers present in deficiency.

In the case of addition of monofunctional compounds Z, the following relationship applies:

$$(X_R)_n = \frac{1+\left(\frac{n_Z^0}{n_M^0}\right)}{1-p+\left(\frac{n_Z^0}{n_M^0}\right)}$$

where $$p = \frac{n_M^0 - n_M}{n_M^0}$$

$n_M^0$: initial amount of the monomer molecules
$n_M$: amount of the monomer molecules still present after a time t
$n_Z^0$: initial amount of the monofunctional compounds.

For further details regarding these calculations, reference is made to the standard specialist literature, especially Hans-Georg Elias "Makromoleküle" [Macromolecules], Volume 1 "Grundlagen: Struktur—Synthese—Eigenschaften" [Basics: Structure—Synthesis—Properties], $5^{th}$ edition (1990), Basle, Heidelberg, N.Y.; Hüthig and Wepf, chapter 7.2.3 "Umsatz and Polymerisationsgrad" [Conversion and degree of polymerization].

It is particularly appropriate, in step i), to initially charge the tetraamino compound and the carboxylic acid compound in a non-equimolar ratio. Particularly favorable molar ratios of tetraamino compound to carboxylic acid compound are in the range from 1.001:1 to 1.1:1, preferably in the range from 1.001:1 to 1.01:1, especially in the range from 1.001:1 to 1.005:1. Preference is likewise given to ratios of tetraamino compound to carboxylic acid compound in the range from 0.5:1 to 0.999:1, preferably in the range from 0.950:1 to 0.999:1, especially in the range from 0.995:1 to 0.999:1.

In addition, it is particularly advantageous when, in step i), monocarboxylic acids, monocarboxylic esters and/or monoamino compounds are added. Particularly suitable monocarboxylic acids comprise formic acid, acetic acid, propanoic acid, butyric acid, pentanoic acid, hexanoic acid and benzoic acid. Particularly suitable monocarboxylic esters comprise methyl, ethyl, propyl, n-butyl and tert-butyl esters of the compounds mentioned. Particularly suitable monoamino compounds comprise primary amines, especially methyl-, ethyl-, propyl-, isopropyl-, n-butyl-, tert-butyl-, n-pentyl-, n-hexylamine and aniline.

The molar ratio of monocarboxylic acids, monocarboxylic esters and/or monoamino compounds to the sum of the tetraamino compounds and of the carboxylic acid compounds having two carboxyl groups is preferably in the range from 0.001:1 to 0.5:1, more preferably in the range from 0.001:1 to 0.05:1, especially in the range from 0.001:1 to 0.005:1.

The molar ratio of monocarboxylic acids, monocarboxylic esters and/or monoamino compounds to the sum of the amino groups and of the carboxyl groups is preferably in the range from 0.001:1 to 0.5:1, more preferably in the range from 0.001:1 to 0.05:1, especially in the range from 0.001:1 to 0.005:1.

Appropriately, the process according to the invention is part of a process for producing a proton-conducting polymer membrane based on polyazoles, comprising the steps of A) mixing one or more aromatic tetraamino compounds with one or more aromatic carboxylic acids or esters thereof which comprise at least two acid groups per carboxylic acid monomer, or mixing one or more aromatic and/or heteroaromatic diaminocarboxylic acids, in polyphosphoric acid to form a solution and/or dispersion B) applying a layer using the mixture according to step A) on a carrier, C) heating the flat structure/sheet obtainable according to step B) under inert gas to temperatures of up to 350° C., preferably up to 280° C., D) treating the membrane formed in step C) until it is self-supporting.

In principle, such a process is already described in general terms in WO 02/088219.

The monomers usable in this context have already been described.

The layer is preferably formed in step B) by means of measures known per se (casting, spraying, knife-coating), which are known from the prior art for polymer film production. Suitable carriers are all carriers which can be described as inert under the conditions. To adjust the viscosity, phosphoric acid (conc. phosphoric acid, 85%) can optionally be added to the solution. This can adjust the viscosity to the desired value and facilitate the formation of the membrane.

The layer obtained in step B) preferably has a thickness between 20 and 4000 µm, preferably between 30 and 3500 µm, especially between 50 and 3000 µm.

The membrane is treated in step D) preferably at temperatures above 0° C. and less than 150° C., more preferably at temperatures between 10° C. and 120° C., especially between room temperature (20° C.) and 90° C., in the presence of moisture or water and/or water vapor and/or water-comprising phosphoric acid of up to 85%. The treatment is effected preferably under standard pressure, but can also be effected under pressure. It is essential that the treatment occurs in the presence of sufficient moisture, as a result of which the polyphosphoric acid present contributes to reinforcement of the membrane as a result of partial hydrolysis to form low molecular weight polyphosphoric acid and/or phosphoric acid.

The partial hydrolysis of the polyphosphoric acid in step D) leads to a reinforcement of the membrane and to a decrease in the layer thickness and formation of a membrane with a thickness between 15 and 3000 µm, preferably between 20 and 2000 µm, especially between 20 and 1500 µm, which is self-supporting.

The intra- and intermolecular structures (interpenetrating networks, IPN) present in the polyphosphoric acid layer according to step B) lead, in step C), to ordered membrane formation which is found to be responsible for the special properties of the membrane formed.

The upper temperature limit of the treatment according to step D) is generally 150° C. In the case of extremely brief action of moisture, for example of superheated steam, this vapor may also be hotter than 150° C. The essential factor for the upper temperature limit is the duration of the treatment.

The partial hydrolysis (step D) can also be effected in climate-controlled chambers in which the hydrolysis can be controlled under defined action of moisture. In this case, the moisture content can be adjusted in a controlled manner via the temperature or saturation of the contact environment, for example gases such as air, nitrogen, carbon dioxide or other suitable gases, or water vapor. The treatment time depends on the parameters selected above.

In addition, the treatment time depends on the thickness of the membrane.

In general, the treatment time is between a few seconds and minutes, for example under the action of superheated steam, or up to whole days, for example under air at room temperature and low relative air humidity. The treatment time is preferably between 10 seconds and 300 hours, especially 1 minute to 200 hours.

When the partial hydrolysis is performed at room temperature (20° C.) with ambient air of relative air humidity 40-80%, the treatment time is between 1 and 200 hours.

The membrane obtained according to step D) can be configured so as to be self-supporting, i.e. it can be detached without damage from the carrier and then optionally processed further directly.

It is possible to adjust the concentration of phosphoric acid and hence the conductivity of the inventive polymer membrane via the degree of hydrolysis, i.e. the time, temperature and ambient humidity. According to the invention, the concentration of phosphoric acid is reported as moles of acid per mole of repeat unit of the polymer. In the context of the present invention, preference is given to a concentration (moles of phosphoric acid based on one repeat unit of the formula (III), i.e. polybenzimidazole) between 10 and 50, especially between 12 and 40. Such high degrees of doping (concentrations) are obtainable only with very great difficulty, if at all, by doping of polyazoles with commercially available orthophosphoric acid.

After the treatment according to step D), the membrane can also be crosslinked at the surface by the action of heat in the presence of atmospheric oxygen. This curing of the membrane surface additionally improves the properties of the membrane.

The crosslinking can also be effected by the action of IR or NIR (IR=InfraRed, i.e. light with a wavelength of more than 700 nm; NIR=Near IR, i.e. light with a wavelength in the range from approx. 700 to 2000 nm, or an energy in the range from approx. 0.6 to 1.75 eV). A further method is irradiation with 13 rays. The radiation dose here is between 5 and 200 kGy.

In one variant of the present invention, the membrane can also be formed directly on the electrode, instead of on a carrier. The treatment according to step D) can be correspondingly shortened as a result, since the membrane need no longer be self-supporting.

To further improve the performance properties, it is additionally possible to add fillers, especially proton-conducting fillers, and additional acids to the resulting polymer or to the membrane.

Nonlimiting examples of proton-conducting fillers are sulfates such as: $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$, phosphates such as $Zr_3(PO_4)_4$, $Zr(HPO_4)_2$, $HZr_2(PO_4)_3$, $UO_2PO_4 \cdot 3H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2O_8$, $HSb_3P_2O_{14}$, $H_5Sb_5P_2O_{20}$, polyacids such as $H_3PW_{12}O_{40} \cdot nH_2O$ (n=21-29), $H_3SiW_{12}O_{40} \cdot nH_2O$ (n=21-29), $H_xWO_3$, $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_9$, $HSbO_3$, $H_2MoO_4$ selenites and arsenides such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$, phosphides such as ZrP, TiP, HfP oxides such as $Al_2O_3$, $Sb_2O_5$, $ThO_2$, $SnO_2$, $ZrO_2$, $MoO_3$ silicates such as zeolites, zeolites ($NH_4+$), sheet silicates, framework silicates, H-natrolites, H-mordenites, $NH_4$-analcines, $NH_4$-sodalites, $NH_4$-gallates, H-montmorillonites, other condensation products of orthosilicic acid $Si(OH)_4$ and the salts and esters thereof, polysiloxanes of the general formula $H_3Si—(O—SiH_2—)_n—O—SiH_3$, and especially also other clay minerals, such as montmorillonites, bentonites, kaolinites, pyrophillites, talc, chlorites, muscovites, mica, smectites, halosites, vermiculites and hydrotalcites.

acids such as $HClO_4$, $SbF_5$ fillers such as carbides, especially SiC, $Si_3N_4$, fibers, especially glass fibers, glass powders and/or polymer fibers, nonwovens or wovens, preferably based on polyazoles and/or polyaryl ether ketones or polyaryl ether sulfones, also partly crosslinked. The fillers may also be modified partly or fully, based on the aromatic content, by charged groups, particularly suitable groups in this context being sulfonic acid groups, phosphonic acid groups, phosphate groups and/or other anionic or cationic charged groups.

These additives may be present in the composition in customary amounts, although the positive properties, such as high conductivity, high lifetime and high mechanical stability, should not be impaired too significantly by addition of excessively large amounts of additives. In general, the resulting polymer or the resulting membrane comprises at most 80% by weight, preferably at most 50% by weight and more preferably at most 20% by weight of additives.

The resulting polymer or resulting membrane may also further comprise perfluorinated sulfonic acid additives (preferably 0.1-20% by weight, more preferably 0.2-15% by weight, very preferably 0.2-10% by weight). These additives lead to improved performance, in the vicinity of the cathode to an increase in the oxygen solubility and oxygen diffusion, and to a reduction in the adsorption of phosphoric acid and phosphate to platinum. (Electrolyte additives for phosphoric acid fuel cells. Gang, Xiao; Hjuler, H. A.; Olsen, C.; Berg, R. W.; Bjerrum, N. J., Chem. Dep. A, Tech. Univ. Denmark, Lyngby, Den., J. Electrochem. Soc. (1993), 140(4), 896-902 and Perfluorosulfonimide as an additive in phosphoric acid fuel cell. Razaq, M.; Razaq, A.; Yeager, E.; DesMarteau, Darryl D.; Singh, S., Case Cent. Electrochem. Sci., Case West. Reserve Univ., Cleveland, Ohio, USA. J. Electrochem. Soc. (1989), 136(2), 385-90.)

Nonlimiting examples of persulfonated additives are: trifluoromethanesulfonic acid, potassium trifluoromethanesulfonate, sodium trifluoromethanesulfonate, lithium trifluoromethanesulfonate, ammonium trifluoromethanesulfonate, potassium perfluorohexanesulfonate, sodium perfluorohexanesulfonate, lithium perfluorohexanesulfonate, ammonium perfluorohexanesulfonate, perfluorohexanesulfonic acid, potassium nonafluorobutanesulfonate, sodium nonafluorobutanesulfonate, lithium nonafluorobutanesulfonate, ammonium nonafluorobutanesulfonate, cesium nonafluorobutanesulfonate, triethylammonium perfluorohexanesulfonate, perfluorosulfoimides and Nafion.

Fields of use of the polymers and membranes obtainable by the process according to the invention comprise especially the use thereof as a polymer electrolyte membrane in fuel cells. For further details, reference is made to publications DE 102 13 540 A1, DE 102 46 559 A1 and DE 102 46 461 A1, the disclosure of which is incorporated herein by reference.

The invention is illustrated further hereinafter by examples, though this shall not restrict the concept of the invention.

EXAMPLE 1

Standard Reaction of 3,3',4,4'-tetraaminobiphenyl (TAB) and Terephthalic Acid (TPA) in Polyphosphoric Acid 3,3',4,4'-Tetraminobiphenyl (TAB) and terephthalic acid (TPA) are mixed in a stoichiometric ratio, and a 2% by weight mixture of the two monomers is initially charged in polyphosphoric acid (PPA, 116%). For this purpose, a 1 l HWS glass reactor is initially charged with 22.53 g of TAB and 17.47 g of TPA in 1960 g of PPA. The general process for this purpose is described in WO 02/088219. The mixture is reacted at 240° C. to form a solution of poly(2,2'-(m-phenylene)-5,5'-bibenzimidazole) (=PBI). Stepwise heating has been found to be particularly advantageous.

The course of the reaction is monitored by the change in the force input of the stirrer, and the torque is recorded digitally. The change in the torque during the reaction is reported in table 1 in the form of extracted readings for different times. By definition, the reaction is to be stopped at a target torque of 100 N/cm. The value was estimated from experience values and fixed equally for all examples (measured by force input, Heidolph RZR 2102 Control stirrer motor).

Table 1 reveals a rapid, approximately exponential rise in torque with advancing reaction. The target torque is attained, in a good approximation, after approx. 100 min. The molecular weight achieved in the PBI polymer is, expressed in terms of the inherent viscosity (IV for short), 6.4 dl/g (the IV is measured in 96-98% sulfuric acid at a concentration of c=1 g/l in a standard Ubbelohde capillary viscometer).

The rapid rise in torque reflects the rapidity of the polycondensation reaction, and shows that the reaction cannot be controlled exactly in industry on a large scale. At high solution viscosities (here assumed to be >100 N/cm), experience has shown that the solution can no longer be processed to give self-supporting membranes. In an industrial scale process, such a high-viscosity solution cannot be removed from a reactor. This can lead to shutdown times for the reactors and considerable costs for cleaning, which should be avoided in such a process. According to the prior art, the reaction is controlled by lowering the temperature below the reaction temperature (approx. 160° C.) shortly before the reaction has ended, in order to prevent continuation of the reaction during processing by cooling. As a result of the high heat capacity of the phosphoric acid, however, this is a method of only limited suitability, and the reaction can—according to the cooling rate—continue under some circumstances, and leads to variations in the physical properties of the polymer solution.

TABLE 1

Change in torque after increasing the reaction temperature to 240° C. until stoppage of the reaction

| t (min) | Solution viscosity (force input of the stirrer) (N/cm) |
|---------|-------------------------------------------------------|
| 0.0     | 1.6                                                   |
| 10.0    | 1.1                                                   |
| 20.0    | 2.2                                                   |
| 30.0    | 5.1                                                   |
| 40.0    | 10.9                                                  |
| 50.0    | 20.1                                                  |
| 60.0    | 33.8                                                  |
| 70.0    | 51.1                                                  |
| 80.0    | 64.8                                                  |
| 90.0    | 76.4                                                  |
| 100.0   | 88.3                                                  |
| 108.0   | 96.7                                                  |

The present invention shows ways of either (a) allowing such a polycondensation reaction to proceed under technical or chemical control or (b) stopping such a polycondensation reaction in a controlled manner at a defined time (see examples which follow).

EXAMPLE 2

Stopper Reaction

Reaction Stoppage by Dilution of a Highly Concentrated PBI-PPA Solution with Demineralized Water Procedure as in example 1, except that this time a 2.3% by weight solution of a stoichiometric mixture of TAB and TPA in PPA is initially charged. To control the reaction, in the present example, on attainment of the target torque of 100 N/cm (cf. example 1), a defined amount of deionized water is metered into the still-hot solution. The variation in the solution viscosity with time, expressed in relative units (N/cm), is summarized in table 4. The inherent viscosity of the polymer at the time of water addition is IV=6.1 dl/g.

The decline in the solution viscosity after addition of water is clearly evident. A constant torque is also established after the addition of water (torque of T=20 N/cm at t=440-470 min), and there is no longer any evident rapid rise as in the preceding condensation reaction (see table 1 in example 1 and reaction times t=180-240 min).

Without a dilution, the solution after a short time would be too viscous for processing to a self-supporting film and would have to be disposed of.

In addition, solutions which have attained a high viscosity in a reactor can be made processible again in this way. This dispenses with complex cleaning procedures for plant and reactors, shutdown periods are avoided, and damage to reactors resulting from mechanical cleaning can be avoided.

TABLE 2

Change in torque after increasing the reaction temperature to 240° C. and after adding water

| Time (min) | Solution viscosity (measured by the force input of the stirrer) (N/cm) |
|---|---|
| t = 0 (17 h 40 min) | 0 (Calibration, temperature 195° C.) |
| t = 60 (18 h 40 min) | 0.5 |
| t = 120 (19 h 40 min) | 1.5 |
| Increase in temperature to 240° C. (reaction) | |
| t = 180 (20 h 40 min) | 1.5 |
| t = 210 (21 h 10 min) | 21.9 |
| t = 220 (21 h 20 min) | 51.5 |
| t = 230 (21 h 30 min) | 84.8 |
| t = 240 (21 h 40 min) | 103.5 |
| Addition of demineralized water, temperature lowered to 200° C. | |
| t = 250 (21 h 50 min) | 96.0 |
| t = 280 (22 h 20 min) | 86.3 |
| t = 290 (22 h 30 min) | 61.2 |
| t = 320 (23 h 00 min) | 67.7 |
| t = 380 (24 h 00 min) | 43.7 |
| t = 440 (25 h 00 min) | 22.0 |
| T = 455 (25 h 15 min) | 23.4 |
| T = 470 (25 h 30 min) | 23.7 |

EXAMPLE 3

Process/Reaction Control by Nonstoichiometric Procedure

At the start of the reaction, 3,3',4,4'-tetraaminobiphenyl (TAB) and terephthalic acid (TPA) are mixed and initially charged in a stoichiometric ratio of 0.99:1. This means that the tetraamino component (TAB) is present in a 1% deficiency. The concentration of monomers in polyphosphoric acid is 2% by weight.

Analogously to examples 1 and 2, the mixture is reacted at 240° C., which at first gives rise to a solution of poly(2,2'-(m-phenylene)-5,5'-bibenzimidazole) (=PBI) in PPA with low molar masses. This can be explained chemically according to the prior art by the Carothers equation (calculation of the polymerization number for polycondensation reactions as a function of the stoichiometric ratio of the monomers). This equation specifically also shows that, in polycondensation reactions, high molar masses cannot arise until conversions of more than 99.9% by weight of the monomers.

The stoichiometric ratio of TAB to TPA in this example accordingly does not lead to high degrees of polymerization and a constant, low solution viscosity in the first step of the reaction.

It is clear in table 3 that, in accordance with this assumption, the molar masses of the PBI polymer—measured by the change in torque of the stirrer—do not rise significantly from t=0 to t=600 min. In example 1, in comparison, in the stoichiometric procedure, the reaction has already attained its target torque after t=108 min (see table 1).

After t=1700 min at 240° C., 0.01 mol of TAB is added to the reaction solution. After addition of the TAB, the reactants are present in a stoichiometric ratio, and the solution viscosity rises.

In table 3, the change in torque with time after increasing the reaction temperature to 240° C. and after balancing the stoichiometry by adding TAB is shown in tabular form.

After addition of the TAB, the solution viscosity rises as a result of a continuation of the polycondensation reaction. However, this is much slower here than described in example 1 for a standard reaction, and so the controllability of the reaction remains good in terms of process technology.

In addition, it is clear in table 3 that the solution viscosity at the desired target torque approaches a finite value which corresponds to the target torque of 100 N/cm (see table 3, t=3150-3900 min).

The inherent viscosity of the polymer at the end of the reaction is IV=6.07 dl/g.

The advantage of this reaction regime is that the solution, for industrial purposes, has very much longer residence times in the tank than a standard reaction according to example 1, and the processability still remains good.

In addition, it is also possible to stop the reaction after the first reaction phase with unbalanced stoichiometry and to cool it. Stored in such a way, the solution can be heated back to reaction temperature at a desired later time, and reacted by balancing the stoichiometry.

TABLE 3

Change in torque after increasing the reaction temperature to 240° C. and after balancing the stoichiometry according to example 3

| Reaction time (min) | Solution viscosity (measured by the force input of the stirrer) (N/cm) |
|---|---|
| 0 | −2.0 |
| 600 | 0.6 |
| 1200 | 2.6 |
| 1620 | 3.7 |
| Stoichiometry balanced by adding TAB | |
| 1740 | 21.5 |
| 1800 | 35.8 |
| 1920 | 46.1 |
| 2160 | 58.5 |
| 2400 | 66.7 |
| 2640 | 73.9 |
| 3150 | 84.6 |
| 3630 | 91.8 |
| 3900 | 98.8 |

EXAMPLE 4

Process/Reaction Control by Using Alternative Polyphosphoric Acids (PPA)

Example 1 describes a standard reaction in which the 3,3', 4,4'-tetraaminobiphenyl (TAB) and terephthalic acid (TPA) monomers are mixed in a stoichiometric ratio, and a 2% by weight solution of monomers in 116% polyphosphoric acid is reacted. It has been found that the reaction times have a surprisingly strong dependence on small changes in the concentration and composition of the PPA, and so alternative polyphosphoric acids of different concentrations offer one means of process control.

Table 4 shows a comparison of the changes in the solution viscosities during the reaction at 240° C. for the conversion of stoichiometric amounts of TAB and TPA in (a) 116% by weight and (b) 118% by weight PPA from the same manufacturer. In each case—analogously to example 1-22.53 g of TAB and 17.47 g of TPA were initially charged in 1960 g of PPA of the particular concentration and then reacted at 240° C. with stepwise heating. The total solids content of the two solutions is thus 2% by weight at the start. The course of the reaction is monitored by the change in force input of the stirrer, and the torque is recorded. The change in torque during the reaction is reported in table 4 and the reactions should be stopped at a target torque of 100 N/cm (measured by force input, Heidolph RZR 2102 Control stirrer motor).

TABLE 4

Comparison of the changes in torque after increasing the reaction temperature to 240° C. until stoppage of the reaction for (a) a standard reaction (cf. example 1) in 116% PPA (left-hand column) and (b) a reaction in 118% PPA (right-hand column) for stoichiometric amounts of TAB and TPA

| t (min) | Standard reaction (116% PPA) Solution viscosity (N/cm) | Reaction in 118% PPA Solution viscosity (N/cm) |
|---|---|---|
| 0.0 | 1.6 | −0.1 |
| 10.0 | 1.1 | −0.5 |
| 20.0 | 2.2 | 0.1 |
| 30.0 | 5.1 | 1.1 |
| 40.0 | 10.9 | 2.9 |
| 50.0 | 20.1 | 6.0 |
| 60.0 | 33.8 | 11.0 |
| 70.0 | 51.1 | 17.1 |
| 80.0 | 64.8 | 24.6 |
| 90.0 | 76.4 | 30.8 |
| 100.0 | 88.3 | 38.6 |
| 108.0 | 96.7 EOR | 43.1 |
| 120.0 | — | 49.6 |
| 180.0 | — | 75.6 |
| 210.0 | — | 80.0 |
| 240.0 | — | 82.3 |
| 270.0 | — | 83.7 |
| 330.0 | — | 85.5 |
| 390.0 | — | 87.0 |
| 450.0 | — | 89.7 |
| 570.0 | — | 89.3 |
| 690.0 | — | 92.2 |
| 810.0 | — | 94.1 |
| 930.0 | — | 97.8 |
| 990.0 | — | 99.9 |
| 1014.0 | — | 99.8 |
| 1014.1 | — | 100 EOR |

While a standard reaction (left-hand column of table) attains its target torque (100 N/cm) after only 108 minutes in an exponentially rising reaction profile at reaction temperature 240° C., the reaction in 118% PPA (right-hand column of table) gradually approaches 100 N/cm in an exponentially declining variation.

A standard reaction thus has to be stopped to remain processible to a membrane for process technology purposes. The reaction in 118% PPA remains processible for several hours with similar molecular weight (390<t (min)<1014) and offers the advantage that no intervention into the course of the reaction is required.

EXAMPLE 5

Stopper Stoppage of a Polycondensation Reaction by Adding a Dilute PBI Solution (Lowering of PPA Concentration)

The aim of the process is stoppage of the reaction by lowering the concentration of the initially charged polyphosphoric acid, except, in contrast to example 2 where water is used for dilution, by adding a dilute PBI-PPA solution. The basis of this process is that, according to the current prior art, polycondensation of TAB and TPA in polyphosphoric acid is no longer performable or is slowed significantly below a concentration of 108% by weight.

The example is based on a standard polycondensation reaction as described in example 1. For this purpose, 2% by weight of a stoichiometric mixture of 3,3',4,4'-tetraaminobiphenyl (TAB) and terephthalic acid (TPA) (total amount of monomer mixture 40 g) in polyphosphoric acid (1960 g of PPA, 116%) are initially charged and reacted while heating stepwise. The change in the solution viscosity is effected by measuring the force input of the stirrer, expressed as the torque of the stirrer. The reaction is conducted after heating to a temperature of 240° C. up to a torque of 100 N/cm. Instead of lowering the temperature—likewise described in example 1—to slow or stop the reaction, on attainment of the target torque in this case, 680 g of a solution of 2.1% by weight of poly(2,2'-(m-phenylene)-5,5'-bibenzimidazole) in 100% o-PA are added. Solutions of this kind are described in the application "polyazole-containing composition" (EP application number 09008110.0). The changes in the solution viscosity during the polycondensation reaction and after addition of the above-described dilute PBI solution can be inferred from table 5.

In table 5, the target torque of the polycondensation reaction has been attained after approx. 710 min. At this time, the above-described dilute PBI-PPA solution is added. It is clearly evident that the torque declines significantly after the addition of the solution (from 94.5 N/cm (710 min) to 56.2 N/cm (840 min)), the reason for which is the dilution of the PPA. It is additionally evident that the torque does not rise again above the target torque (100 N/cm at 710 min) until the end of data recording ($t_{reaction}$=1520 min). In contrast to a standard polycondensation (cf. example 1), the controllability of the solution thus remains good and it remains technically processible. A rapid rise as in the preceding condensation reaction (see table 1 in example 1 and reaction times t=180-240 min) is no longer evident. The inherent viscosity of the polymer at the end of the reaction is IV=5.06 dl/g.

TABLE 5

Comparison of the changes in torque after increasing the reaction temperature to 240° C. until stoppage of the reaction by adding a dilute PBI solution and evolution of the torque after addition of the dilute solution.

| Time (min) | Solution viscosity (measured by the force input of the stirrer) (N/cm) |
|---|---|
| 0.00 | 0.0 |
| 20.00 | 0.8 |
| 40.00 | 8.5 |
| 50.00 | 21.7 |
| 60.00 | 41.9 |
| 80.00 | 59.7 |
| 160.00 | 65.5 |
| 200.00 | 67.6 |
| 230.00 | 71.3 |
| 350.00 | 75.1 |
| 530.00 | 87.3 |
| 710.00 | 97.7 |
| 770 | 94.5 |
| (addition of dilute PBI solution) | |
| 774.00 | 72.5 |
| 782.00 | 63.9 |
| 790.00 | 59.1 |
| 810.00 | 56.3 |
| 840.00 | 56.2 |
| 1080.00 | 67.2 |
| 1380.00 | 72.0 |
| 1520.00 | 74.3 |

The invention claimed is:

1. A process for preparing a polyazole with an inherent viscosity, measured in at least 96% sulfuric acid at 25° C., greater than 2.9 dl/g, comprising the steps of
  i) mixing one or more aromatic tetramino compounds with one or more aromatic carboxylic acids or esters thereof which comprise at least two acid groups per carboxylic acid monomer, or mixing one or more aromatic and/or heteroaromatic diaminocarboxylic acids, in polyphosphoric acid to form a solution and/or dispersion ii) heating the mixture from step i) under inert gas to temperatures in the range from 120° C. to 350° C. to form the polyazole, which comprises in step ii), heating a mixture having a concentration of polyphosphoric acid, calculated as $P_2O_5$ (by acidimetric means), based on the total amount of $H_3PO_4$, polyphosphoric acid and water in the mixture, greater than 78.22%, selecting the amounts of the components in step i) such that the proportion by weight of the tetramino compounds and of the aromatic carboxylic acids or esters thereof which comprise at least two acid groups per carboxylic acid monomer, or of the diaminocarboxylic acids of the mixture in step ii), based on the total weight of the mixture, is less than 7.0% by weight, heating the reaction mixture in step ii) to greater than 220° C.

2. The process according to claim 1, wherein, in step ii), a mixture having a concentration of polyphosphoric acid, calculated as $P_2O_5$ (by acidimetric means), based on the total amount of $H_3PO_4$, polyphosphoric acid and water in the mixture, of less than 84.74% is heated.

3. The process according to claim 1, wherein, in step ii), the concentration of the polyphosphoric acid in the mixture, calculated as $P_2O_5$ (by acidimetric means), based on the total amount of $H_3PO_4$, polyphosphoric acid and water in the mixture, is reduced.

4. The process according to claim 3, wherein, in step ii), a composition added in the form of a solution and/or dispersion comprises at least one polyazole with an intrinsic viscosity, measured in at least 96% by weight sulfuric acid, in the range from 3.0 to 8.0 g/dl, and orthophosphoric acid and/or polyphosphoric acid, where the polyazole content, based on the total weight of the composition, is in the range from 0.5% by weight to 30.0% by weight, the $H_3PO_4$ and/or polyphosphoric acid content, based on the total weight of the composition, is in the range from 30.0% by weight to 99.5% by weight, the $H_3PO_4$ and/or polyphosphoric acid concentration, calculated as $P_2O_5$ (by acidimetric means), based on the total amount of $H_3PO_4$ and/or polyphosphoric acid and/or water, is in the range from 70.5% to 75.45%.

5. The process according to claim 4, wherein, in step ii), 0.1% by weight to 50.0% by weight of the composition is added, based on the total weight of the mixture from step i).

6. The process according to claim 4, wherein orthophosphoric acid is added in step ii).

7. The process according to claim 1, wherein, in step i), the tetraamino compound and the carboxylic acid compound are initially charged in a non-equimolar ratio.

8. The process according to claim 1, wherein, in step i), monocarboxylic acids, monocarboxylic esters and/or monoamino compounds are further added.

9. The process according to claim 1, which is part of a process for producing a proton-conducting polymer membrane based on polyazoles, comprising the steps of A) mixing one or more aromatic tetramino compounds with one or more aromatic carboxylic acids or esters thereof which comprise at least two acid groups per carboxylic acid monomer, or mixing one or more aromatic and/or heteroaromatic diaminocarboxylic acids, in polyphosphoric acid to form a solution and/or dispersion B) applying a layer using the mixture according to step A) on a carrier, C) heating the flat structure/sheet obtainable according to step B) under inert gas to temperatures of up to 350° C., D) treating the membrane formed in step C) until it is self-supporting.

10. The process according to claim 1, wherein the aromatic tetramino compound used is 3,3',4,4'-tetraminobiphenyl, 2,3,5,6-tetraminopyridine, 1,2,4,5-tetraminobenzene, 3,3',4,4'-tetraminodiphenyl sulfone, 3,3',4,4'-tetraaminodiphenyl ether, 3,3',4,4'-tetraminobenzophenone, 3,3',4,4'-tetraaminodiphenylmethane or 3,3',4,4'-tetraminodiphenyldimethylmethane.

11. The process according to claim 1, wherein the aromatic dicarboxylic acid used is isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,5-dihydroxyisophthalic acid, 2,3-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether-4,4'-dicarboxylic acid, benzophenone-4,4'-dicarboxylic acid, diphenyl sulfone-4,4'-dicarboxylic acid, biphenyl-4,4'-dicarboxylic acid, 4-trifluoromethylphthalic acid, 2,2-bis(4-carboxyphenyl)hexafluoropropane, 4,4'-stilbenedicarboxylic acid, 4-carboxycinnamic acid, or the C1-C20-alkyl esters or C5-C12-aryl esters thereof, or the acid anhydrides thereof or the acid chlorides thereof.

12. The process according to claim 1, wherein a polyazole-based polymer is obtained and has repeat azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVI) and/or (XVII) and/or (XVIII) and/or (XIX) and/or (XX) and/or (XXI) and/or (XXII)

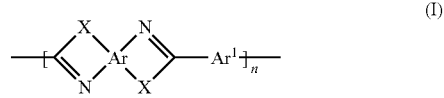

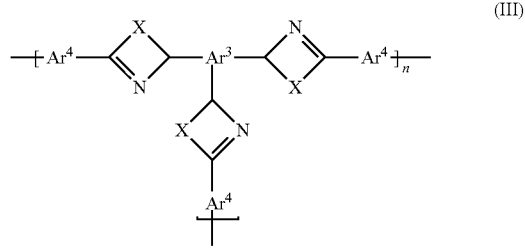

-continued
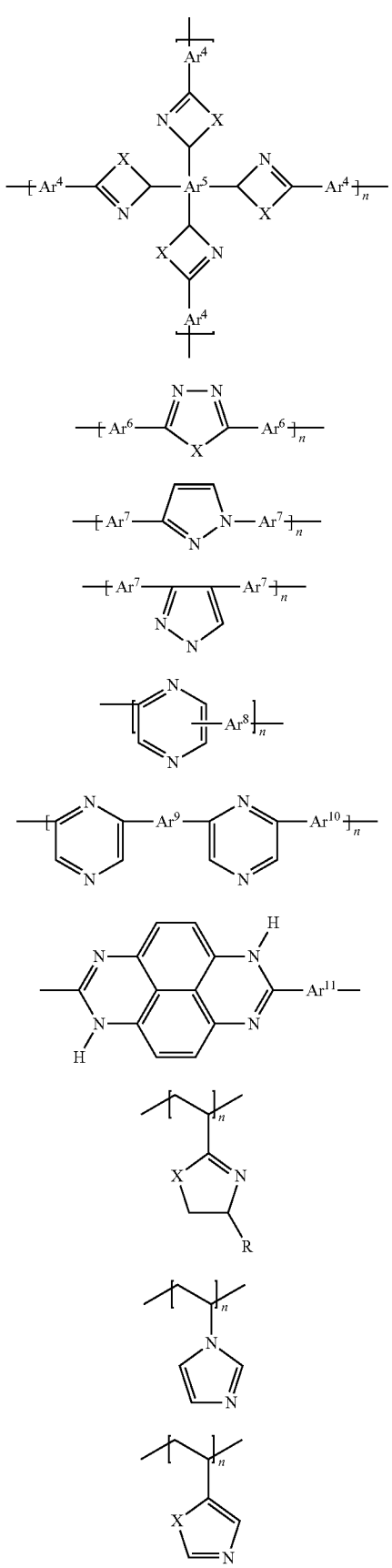
(IV)
(V)
(VI)
(VII)
(VIII)
(IX)
(X)
(XI)
(XII)
(XIII)
-continued
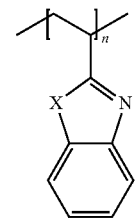   (XIV)
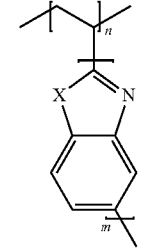   (XV)
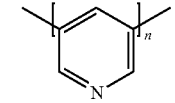   (XVI)
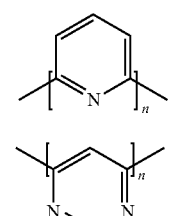   (XVII)
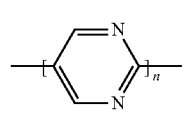   (XVIII)
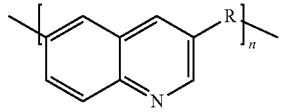   (XIX)
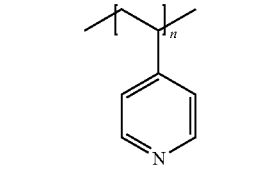   (XX)
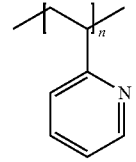   (XXI)
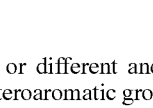   (XXII)
in which
  Ar are the same or different and are each a tetravalent aromatic or heteroaromatic group which may be mono- or polycyclic,
  $Ar^1$ are the same or different and are each a divalent aromatic or heteroaromatic group which may be mono- or polycyclic, $Ar^2$ are the same or different and are each a di- or trivalent aromatic or heteroaromatic group which may be mono- or polycyclic, $Ar^3$ are the same or different and are each a trivalent aromatic or heteroaromatic group which may be mono- or polycyclic, $Ar^4$ are the same or different and are each a trivalent aromatic or heteroaromatic group which may be mono- or polycyclic, $Ar^5$ are the same or different and are each a tetravalent aromatic or heteroaromatic group which may be mono- or polycyclic, $Ar^6$ are the same or different and are each a divalent aromatic or heteroaromatic group which may be mono- or polycyclic, $Ar^7$ are the same or different and are each a divalent aromatic or heteroaromatic group which may be mono- or polycyclic, $Ar^8$ are the same or different and are each a trivalent aromatic or heteroaromatic group which may be mono- or polycyclic, $Ar^9$ are the same or different and are each a di- or tri- or tetravalent aromatic or heteroaromatic group which may be mono- or polycyclic, $Ar^{10}$ are the same or different and are each a di- or trivalent aromatic or heteroaromatic group which may be mono- or polycyclic, $Ar^{11}$ are the same or different and are each a divalent aromatic or heteroaromatic group which may be mono- or polycyclic, X is the same or different and is oxygen, sulfur or an amino group which bears a hydrogen atom, a group having 1-20 carbon atoms, R is the same or different and is hydrogen, an alkyl group or an aromatic group and n and m are each integers greater than or equal to 10.

13. The process according to claim 1, which is part of a process for producing a proton-conducting polymer membrane based on polyazoles, comprising the steps of A) mixing one or more aromatic tetramino compounds with one or more aromatic carboxylic acids or esters thereof which comprise at least two acid groups per carboxylic acid monomer, or mixing one or more aromatic and/or heteroaromatic diaminocarboxylic acids, in polyphosphoric acid to form a solution and/or dispersion B) applying a layer using the mixture according to step A) on a carrier, C) heating the flat structure/sheet obtainable according to step B) under inert gas to temperatures of up to 280° C., D) treating the membrane formed in step C) until it is self-supporting.

14. The process according to claim 12, wherein

X is the same or different and is oxygen, sulfur or an amino group which bears a hydrogen atom, a group having 1-20 carbon atoms wherein the group is a branched or unbranched alkyl, alkoxy group, or an aryl group as a further radical, R is the same or different and is hydrogen, an alkyl group or an aromatic group and n and m are each integers greater than or equal to 100.

15. The process according to claim 1, wherein, in step ii), a mixture having a concentration of polyphosphoric acid, calculated as $P_2O_5$ (by acidimetric means), based on the total amount of $H_3PO_4$, polyphosphoric acid and water in the mixture, of greater than 81.85% is heated.

16. The process according to claim 2, wherein, in step ii), a mixture having a concentration of polyphosphoric acid, calculated as $P_2O_5$ (by acidimetric means), based on the total amount of $H_3PO_4$, polyphosphoric acid and water in the mixture, of greater than 82.57% is heated.

17. The process according to claim 1, wherein, in step ii), a mixture having a concentration of polyphosphoric acid, calculated as $P_2O_5$ (by acidimetric means), based on the total amount of $H_3PO_4$, polyphosphoric acid and water in the mixture, of greater than 83.29% is heated.

18. The process according to claim 1, wherein the amounts of the components in step i) are selected such that the proportion by weight of the tetramino compounds and of the aromatic carboxylic acids or esters thereof which comprise at least two acid groups per carboxylic acid monomer, or of the diaminocarboxylic acids of the mixture in step ii), based on the total weight of the mixture, is less than 5.0% by weight.

19. The process according to claim 16, wherein the amounts of the components in step i) are selected such that the proportion by weight of the tetramino compounds and of the aromatic carboxylic acids or esters thereof which comprise at least two acid groups per carboxylic acid monomer, or of the diaminocarboxylic acids of the mixture in step ii), based on the total weight of the mixture, is less than 4.0% by weight.

20. The process according to claim 1, wherein the reaction mixture in step ii) is heated to greater than 230° C.

21. The process according to claim 19, wherein the reaction mixture in step ii) is heated to 240° C. or greater.

* * * * *